United States Patent Office 2,819,170

Patented Jan. 7, 1958

2,819,170

VITRIFIABLE FLUX AND SILVER COMPOSITIONS CONTAINING SAME

Oliver A. Short, Metuchen, N. J., assignor to E. I. du Pont de Nemours and Company, Wilmington, Del., a corporation of Delaware No Drawing. Application August 6, 1954
Serial No. 448,374

9 Claims. (Cl. 106—48)

This invention relates to a new and improved vitrifiable flux and to an improved silver composition for the production of fired-on, electrically conductive silver coatings on ceramic objects.

Silver compositions comprising finely divided particles of silver and a vitrifiable flux dispersed in a liquid vehicle have been used in preparing fired-on silver coatings on ceramic objects. Compositions which contain a bismuth oxide-lead borosilicate flux and yield fired-on silver coatings that are wetted by solder without first burnishing or copper plating the same are described in Knox U. S. Patent 2,385,580. Because they give directly solderable silver coatings, particularly on high dielectric constant titanate bodies as well as other ceramic materials, the compositions of the patent have found wide use. However, the solder wettability and the electrical properties of the resulting silver coatings are not as satisfactory as desired on low dielectric constant bodies.

The term "ceramic" as used herein is meant to include glasses such as the lime-silicate, borosilicate and metal-borosilicate glasses and also colored and optical glasses; china porcelain and other vitrifiable clays and the like; and vitreous dielectric material such as mica, steatite porcelain, titanates such as barium titanate, and titanium dioxide bodies, and the like.

Throughout the specification and claims all parts, proportions and percentages are by weight, unless stated to be otherwise.

It is an object of the invention to provide a new and improved vitrifiable flux. Another object is to provide an improved silver composition containing an improved flux, which composition yields adherent directly solderable fired-on silver coatings having improved electrical properties on either low or high dielectric constant bodies. Still other objects will be apparent from the following description.

The present improved vitrifiable flux comprises bismuth trioxide and a cadmium borate composition. The present improved silver composition comprises a dispersion of finely divided particles of silver and finely divided particles of the above flux in a vehicle.

The improved flux will generally comprise (A) 50 to 95% $Bi_2O_3$ and (B) 5 to 50% of a cadmium borate composition containing 50 to 95% CdO, 5 to 50% $B_2O_3$ and 0 to 15% $SiO_2$. The above percentage ranges for flux components (A) and (B) and for the oxide constituents of the latter are recommended since, if they are not met, the final silver coatings will generally be deficient in one or more electrical properties, in adherence, or in solder wettability. However, components (A) and (B) may contain materials other than those stated. For example, they may contain minor amounts of ZnO, CaO, BaO, MgO, $TiO_2$, $ZrO_2$, $Al_2O_3$ or $Sb_2O_3$, but the total amount of (A) plus (B) should be at least 75% of the total weight of the flux.

The preferred flux will comprise (A) 60 to 90% $Bi_2O_3$ and (B) 10 to 40% of a cadmium borate composition containing 60 to 90% CdO, 10 to 48% $B_2O_3$ and 1 to 10% $SiO_2$, with components (A) and (B) together equal to at least 75% and preferably at least 90% of the total weight of the flux.

Component (A) of the flux can be bismuth trioxide ($Bi_2O_3$) or any compound such as bismuth subnitrate which yields bismuth trioxide under firing conditions.

Component (B) of the flux may be present in the form of a glass frit prepared by fusing together the desired proportions of cadmium oxide, or a compound such as cadmium carbonate which yields cadmium oxide at the fusion temperature, and boric acid or boric oxide, with or without $SiO_2$; pouring the melt into water, and grinding the resulting glass frit in a ball mill to a finely divided powder. Since a small amount of $SiO_2$ will be dissolved from the crucible in which the mix is melted when a clay crucible is used, separate addition of $SiO_2$ to the mix may or may not be desirable. Instead of fritting the cadmium borate composition, a physical blend of CdO powder and fused or unfused boric acid may be used.

The cadmium borate glasses formed in the preparation of frits for component (B) are quite corrosive to most crucible materials and this corrosive property increases as the cadmium oxide content of the glass is increased. A practical way of reducing crucible corrosion is to prepare a glass frit containing about 50 to 70% CdO and then add to the resulting finely divided frit additional cadmium oxide as required to produce a component (B) mixture having the desired CdO content.

The final flux composition is prepared by thoroughly mixing the desired proportions of components (A) and (B), both in finely divided form, for example, 20 mesh (i. e. 20 meshes per linear inch) or finer. The resulting mixture can be used as such in preparing the silver composition, or it can first be sintered, ball-milled in water to a finely divided form, dried and then used.

The silver composition will usually be prepared by dispersing in a liquid vehicle about 3 to 20, preferably 4 to 10, parts of finely divided particles of silver for each part of the flux. The silver particles should be sufficiently finely divided to pass through a screen of 20 mesh size or finer. The particle size of the silver preferably will be at least as fine as about 200 to 325 mesh. The amount of liquid vehicle in the silver composition is not critical and may vary considerably depending upon whether a paste or liquid composition is desired.

The silver particles may be in the form either of metallic silver (preferred) or of a silver compound, such as the oxide or carbonate, which will be converted to metallic silver during firing at the temperature employed. When not specifically directed to metallic silver, the terms "silver," "silver particles" or "finely divided silver" as used herein with reference to the silver composition before it is fired are meant to include, besides metallic silver, silver in any form which will be converted to metallic silver during firing.

Any liquid vehicle which functions to hold the silver and flux particles together and in good admixture and will not prevent the production of metallic silver during the firing operation can be used in preparing the silver composition. Many suitable vehicles are known, such as those disclosed in the above Knox patent. In many instances, the vehicle used will contain a volatile organic solvent so that the resulting silver composition will be of the well-known air-drying type. Vehicles which are of the thermo-fluid type may also be used in practicing the present invention to give silver compositions which are solid at normal application temperatures but which become fluid when heated to somewhat higher temperatures. Thermo-fluid compositions are applied at a temperature at which they are fluid or pasty while the object to which they are applied is at a lower temperature at which the composition rapidly forms a firm adherent coating.

The silver composition can be applied to the ceramic object by any desired method, for example, by brushing, spraying, dipping or screen stenciling, following which the object is dried if necessary and fired in customary manner to fuse firmly the silver-flux composition to the ceramic object. The fused flux functions as a vitreous matrix for the metallic silver particles and binds them to the surface of the ceramic object.

Use of the present cadmium borate composition in place of previous lead borosilicate compositions in fluxes for silver compositions results in several distinct and important improvements. The resulting silver compositions can be fired on ceramic objects over a considerably wider temperature range and still give fired-on silver coatings which are directly solderable and strongly adherent. Moreover, the resulting fired-on silver will generally be more adherent when the ceramic object is a low molecular weight alkaline earth titanate, e. g. a calcium titanate, or a titanium dioxide dielectric body, and at least as adherent as the Knox compositions on barium titanate, and is more easily soldered, without first burnishing or electroplating, than when a lead borosilicate is used in the flux. In the preparation of ceramic capacitors, the present silver compositions are advantageous in that they yield capacitors having a lower power factor and somewhat higher capacitance than do capacitors prepared using silver compositions containing lead borosilicate.

The soldering of metal objects, e. g. electrical lead wires, to the fired-on silver coating can be readily accomplished using the commonly known soft solders, e. g. one containing about equal parts of tin and lead, but such solders containing a small amount of silver are preferred. Fluxing of the silver surface prior to soldering using any common rosin solder flux is advantageous.

The invention is illustrated by the following examples.

*Example 1*

A mixture of 257 parts cadmium oxide (CdO) and 124 parts boric acid ($H_3BO_3$) was melted and the melt then fritted by pouring in water to give a frit containing about 78.5% CdO and 21.5% $B_2O_3$. After grinding the frit in water in a ball mill to a fineness of about 200 mesh, the frit was filtered from the resulting slurry, dried, then thoroughly mixed with 4 times its weight of bismuth trioxide ($Bi_2O_3$). The resulting flux was dispersed, together with finely divided (about 200 mesh) silver, in a vehicle comprising 7.3% ethyl cellulose, 23.0% hexaline glycol and 69.7% carbitol acetate, together with small amounts of phosphorated tall oil and diethyl oxalate. The proportions were:

| | Parts |
|---|---|
| Silver | 62.0 |
| Flux | 11.2 |
| Vehicle | 26.8 |

The resulting silver composition was coated onto titanium dioxide dielectric bodies by the screen stencil method and the coated bodies were fired at 1400° F. The fired-on silver coatings were fluxed with a standard rosin flux then dipped into a molten solder bath comprising 62% tin, 36% lead and 2% silver maintained at 210 to 220° C. The solder readily wet the fired-on silver coatings.

When the above procedure was repeated, using a similar silver composition prepared with a $Bi_2O_3$-lead borosilicate flux of the Knox type in place of the above flux, the solder did not wet the fired-on silver coatings on the titanium dioxide bodies.

*Example 2*

A silver composition was prepared and coated on titanium dioxide dielectric bodies as described in Example 1, with the exception that the flux used in the silver composition was made by mixing 4 parts of bismuth trioxide and 1 part of a frit prepared from 771 parts of cadmium oxide with 124 parts of boric acid. The approximate composition of the frit was 91.7% CdO and 8.3% $B_2O_3$. The fired-on silver coatings obtained at a firing temperature of 1375° F., were readily wet by the solder and the strength of the bond between the silver layer and the ceramic object was approximately double that for silver coatings obtained under the same conditions from a similar silver composition containing a bismuth oxide-lead borosilicate flux.

*Example 3*

Silver compositions giving results generally similar to those for the above examples were prepared as generally described in Example 1 using as the cadmium borate components of the flux frits containing 87% CdO and 13% $B_2O_3$, and 70% CdO and 30% $B_2O_3$.

*Example 4*

A frit was prepared containing 70% CdO, 20% $B_2O_3$ and 10% $SiO_2$. One part thereof was mixed with 4 parts of bismuth trioxide to give a flux which was used to prepare a silver composition as described in Example 1. Dielectric capacitor bodies of the low dielectric constant type coated with the latter, yielded on firing at 1400° F. fired-on silver coatings which were readily wet by solder and had a strong bond between the silver layer and the ceramic body. The resulting capacitors had a high capacitance and a low power factor. Thus, capacitors prepared using the above silver composition to provide circular electrode areas 1.1 cm. in diameter on each side of 0.5 mm. thick titanium dioxide dielectric chips ($k$=about 100) showed a capacity of 150–155 mmf. and a power factor of 0.040%.

The above examples illustrate silver compositions of a pasty consistency suitable for application to ceramic objects by the screen stencil method. If the application is by means of a brush, or by spraying or dipping methods, somewhat less viscous compositions will generally be desired. Reduction in the viscosity can be achieved by reducing the amount of ethyl cellulose or by increasing the amount of volatile solvents, or both, in the vehicle shown in Example 1. Other types of commonly used vehicles can be employed and their choice and composition will depend largely upon the particular method chosen for applying the silver composition.

I claim:

1. A vitrifiable flux consisting essentially of 50 to 95% bismuth trioxide and 5 to 50% of a cadmium borate composition consisting essentially of 50 to 95% CdO, 5 to 50% $B_2O_3$ and 0 to 15% $SiO_2$.

2. A vitrifiable flux consisting essentially of 50 to 95% bismuth trioxide and 5 to 50% of a cadmium borate composition consisting essentially of 50 to 95% CdO, 5 to 50% $B_2O_3$ and 0 to 15% $SiO_2$, the above oxide components constituting at least 75% of said flux.

3. A silver composition comprising finely divided metallic silver and vitrifiable flux particles dispersed in a vehicle in a weight proportion of silver to flux of between 3:1 and 20:1, said flux consisting essentially of 50 to 95% bismuth trioxide and 5 to 50% of a cadmium borate composition consisting essentially of 50 to 95% CdO, 5 to 50% $B_2O_3$ and 0 to 15% $SiO_2$.

4. A silver composition comprising finely divided metallic silver and vitrifiable flux particles dispersed in a vehicle in a weight proportion of silver to flux of between 3:1 and 20:1, said flux consisting essentially of 50 to 95% bismuth oxide, and 5 to 50% of a cadmium borate composition consisting essentially of 50 to 95% CdO, 5 to 50% $B_2O_3$ and 0 to 15% $SiO_2$, the above oxide components constituting at least 75% of said flux.

5. The composition of claim 3 in which the weight proportion of silver to flux is between 4:1 and 10:1.

6. The composition of claim 4 in which the weight proportion of silver to flux is between 4:1 and 10:1.

7. A new article of manufacture comprising a ceramic object having firmly fused to the surface thereof a composition comprising finely divided metallic silver in a vitreous matrix, the weight proportion of metallic silver to matrix being between 3:1 and 20:1 said matrix consisting essentially of 50 to 95% bismuth trioxide and 5 to 50% of a cadmium borate composition consisting essentially of 50 to 95% CdO, 5 to 50% $B_2O_3$ and 0 to 15% $SiO_2$.

8. A new article of manufacture comprising a ceramic object having firmly fused to the surface thereof a composition comprising finely divided metallic silver in a vitreous matrix, the weight proportion of metallic silver to matrix being between 3:1 and 20:1 said matrix consisting essentially of 50 to 95% bismuth oxide and 5 to 50% of a cadmium borate composition consisting essentially of 50 to 95% CdO, 5 to 50% $B_2O_3$ and 0 to 15% $SiO_2$, the above oxide components constituting at least 75% of said matrix.

9. A new article of manufacture comprising a ceramic object having firmly fused to the surface thereof a composition comprising finely divided metallic silver in a vitreous matrix, the weight proportion of metallic silver to matrix being between 4:1 and 10:1, said matrix consisting essentially of 50 to 95% bismuth trioxide and 5 to 50% of a cadmium borate composition consisting essentially of 50 to 95% CdO, 5 to 50% $B_2O_3$ and 0 to 15% $SiO_2$, said oxide components constituting at least 75% of said matrix.

References Cited in the file of this patent

UNITED STATES PATENTS 2,385,580 Knox ---------------- Sept. 25, 1945